(12) United States Patent
Kobayashi

(10) Patent No.: US 7,581,759 B2
(45) Date of Patent: Sep. 1, 2009

(54) FUEL TANK OF MOTORCYCLE

(75) Inventor: Manabu Kobayashi, Hamamatsu (JP)

(73) Assignee: Suzuki Kabushiki Kaisha, Hamamatsu-Shi (JP)

( * ) Notice: Subject to any disclaimer, the term of this patent is extended or adjusted under 35 U.S.C. 154(b) by 201 days.

(21) Appl. No.: 11/783,827

(22) Filed: Apr. 12, 2007

(65) Prior Publication Data

US 2007/0240925 A1 Oct. 18, 2007

(30) Foreign Application Priority Data

Apr. 12, 2006 (JP) ............................. 2006-109316

(51) Int. Cl.
*B60P 3/22* (2006.01)

(52) U.S. Cl. ..................... 280/835; 73/317; 340/625; 116/229

(58) Field of Classification Search ....... 220/4.12–4.14; 73/313, 311, 317–318; 340/625; 116/229; 137/192; 280/833–835; 180/219
See application file for complete search history.

(56) References Cited

U.S. PATENT DOCUMENTS 5,040,516 A * 8/1991 Haraguchi ................. 123/509
6,182,640 B1 * 2/2001 Nakashima et al. ......... 123/516

* cited by examiner

*Primary Examiner*—Lesley D Morris
*Assistant Examiner*—Levon J. Fiore
(74) *Attorney, Agent, or Firm*—Pillsbury Winthrop Shaw Pittman, LLP

(57) ABSTRACT

A fuel tank of a motorcycle is disposed in front of a rider's seat and above an engine mounted between a front wheel and a rear wheel. The fuel tank is formed such that an entire transverse section has a recessed shape viewed form the lower side thereof. The rear half of the fuel tank has a tapered shape toward rearward as viewed from the side. A lower opening of the fuel tank is closed by a bottom plate having a flat portion declining rearward, and a communication hole is formed so as to allow communication between the inside and outside of the fuel tank and insertion of a fuel pump and a fuel gauge, the communication hole being liquid-tightly closed by a lid member. A fuel gauge is fixed to the bottom plate near the front of the communication hole via a bracket, and the fuel pump provided with a fuel strainer attached to the rear end thereof is arranged behind the fuel gauge so as to extend along the longitudinal axis thereof. The fuel pump is mounted and supported on a stay extending from the lid member.

2 Claims, 4 Drawing Sheets

FUEL TANK OF MOTORCYCLE

BACKGROUND OF THE INVENTION

1. Field of the Invention

The present invention relates to a fuel tank of a motorcycle.

2. Related Art

There is known a motorcycle having a fuel gauge for detecting a fuel level in a fuel tank and indicating quantity of remaining fuel to a user. Such a fuel gauge is generally mounted in the fuel tank. In a known method of mounting such a fuel gauge, an opening is formed in the bottom plate of the fuel tank, the fuel gauge is then fixed to a lid member to close the opening, and thereafter, the fuel gauge is inserted into the fuel tank through the opening to thereby close the opening with the lid member.

Incidentally, in recent days, there has been known a system for supplying fuel to an engine by a fuel injector, and in this case, a fuel pump is provided in the fuel tank. An example of a method of mounting the fuel pump includes a step of forming an opening in the bottom plate of the fuel tank, fixing the fuel pump to a lid member to close the opening, inserting the fuel pump into the fuel tank through the opening, and closing the opening with the lid member. In this method, a fuel pump is integrally provided with a fuel gauge.

However, there is such a case that a shape of the fuel tank and an arrangement of peripheral devices may make it difficult to integrally provide the fuel pump with the fuel gauge. This may require to form another opening in the bottom plate of the fuel tank in order to mount the fuel gauge in the fuel tank. As a result, the fuel tank structure is made complicated, the layout of the peripheral devices is affected, and the cost is increased.

SUMMARY OF THE INVENTION

The present invention was conceived in consideration of the circumstances encountered in the prior art mentioned above, and an object of the invention is to provide a fuel tank of a motorcycle designed so as to allow a fuel pump and a fuel gauge to be mounted without increasing a manufacturing cost.

The above object can be achieved by the present invention by providing a fuel tank of a motorcycle provided with a motorcycle body, front and rear wheels, an engine mounted to the motorcycle body between the front and rear wheels, a rider's seat disposed therebetween, and a fuel tank disposed in front of a rider's seat and above an engine, wherein the fuel tank has a transverse section having an entirely recessed shape viewed from a lower side thereof and is tapered in a teardrop shape toward a rear half side of the fuel tank in a side view, the fuel tank has a lower opening which is closed by a bottom plate, the bottom plate having a rear portion formed with a flat portion declining rearward, and the bottom plate is formed with a communication hole so as to establish communication between the inside and outside of the fuel tank, the communication hole having a size such that a fuel pump and a fuel gauge are inserted and being closed liquid-tightly by a lid member from an outside thereof, a fuel gauge is fixed to the bottom plate of the fuel tank at a portion near the front of the communication hole via a bracket, the fuel pump is provided with a fuel strainer attached to the rear end thereof and arranged behind the fuel gauge so as to extend along the longitudinal axis thereof, and the fuel pump is mounted and supported on a stay extending from the lid member.

In a preferred embodiment of the above aspect of the present invention, the fuel gauge may include a sensor arm having a float at a leading end portion thereof to be vertically swingable, and the float is disposed on one side of the fuel tank in a width direction.

It may be desired that signal lines extending from the fuel gauge are disposed so as to extend outward fuel tank through the lid member.

According to the fuel tank of the motorcycle of the present invention of the characters mentioned above, it is not necessary to specifically form a communication hole in the bottom plate of a fuel tank to insert a fuel gauge. Therefore, the fuel tank having a simple structure can be provided with decreased manufacturing cost.

The nature and further characteristic features of the present invention will be made clearer from the following descriptions made with reference to the accompanying drawings.

DESCRIPTION OF THE PREFERRED EMBODIMENT

The present invention will be described hereunder with reference to the accompanying drawings. Further, it is to be noted that terms "upper", "lower", "right", "left" and the like terms are used herein with reference to the illustration of the drawings or in an actual use state of the motorcycle.

Figure 1:
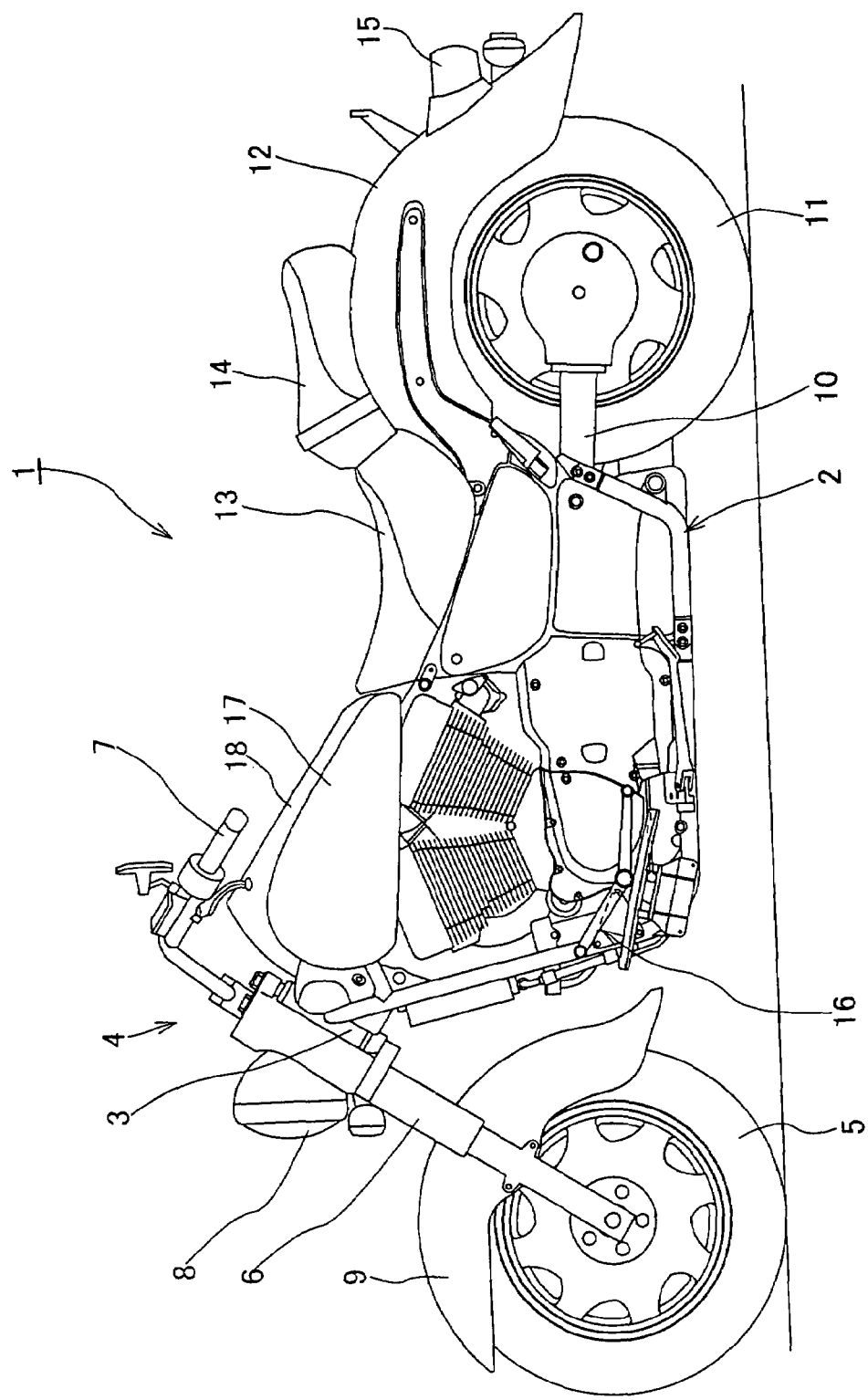
FIG. 1 is a left side view of a motorcycle provided with a fuel tank according to an embodiment of the present invention.

With reference to FIG. 1, the motorcycle 1 has a body frame 2, and a head pipe 3 is provided at the front portion of the body frame 2. A steering mechanism 4 is provided on the head pipe 3 and includes a front fork 6 swingably supporting a front wheel 5 and a handlebar 7 so that the front wheel 5 is steered by the handlebar 7 to the right or left. A headlight 8, front fender 9, etc. are mounted on the front fork 6.

On the other hand, a drive shaft 10 serving as a swing arm is swingably pivoted to the rear side of the body frame 2. A rear wheel 11 is rotatably supported at the rear end of the drive shaft 10, and a rear fender 12 is disposed above the rear wheel 11. A rider's seat is disposed in front of the rear fender 12, and on the other hand, a pillion seat 14 is disposed on the rear fender 12. A tail lamp is also arranged to the rear portion of the rear fender 12.

An engine 16 is mounted between the front wheel 5 and the rear wheel 11 and at a front lower portion of the body frame. A fuel tank 17 is also arranged above the engine 16 and in front of the rider's seat 13. A meter panel 18 is disposed on the upper surface of the fuel tank 17.

Figure 2:
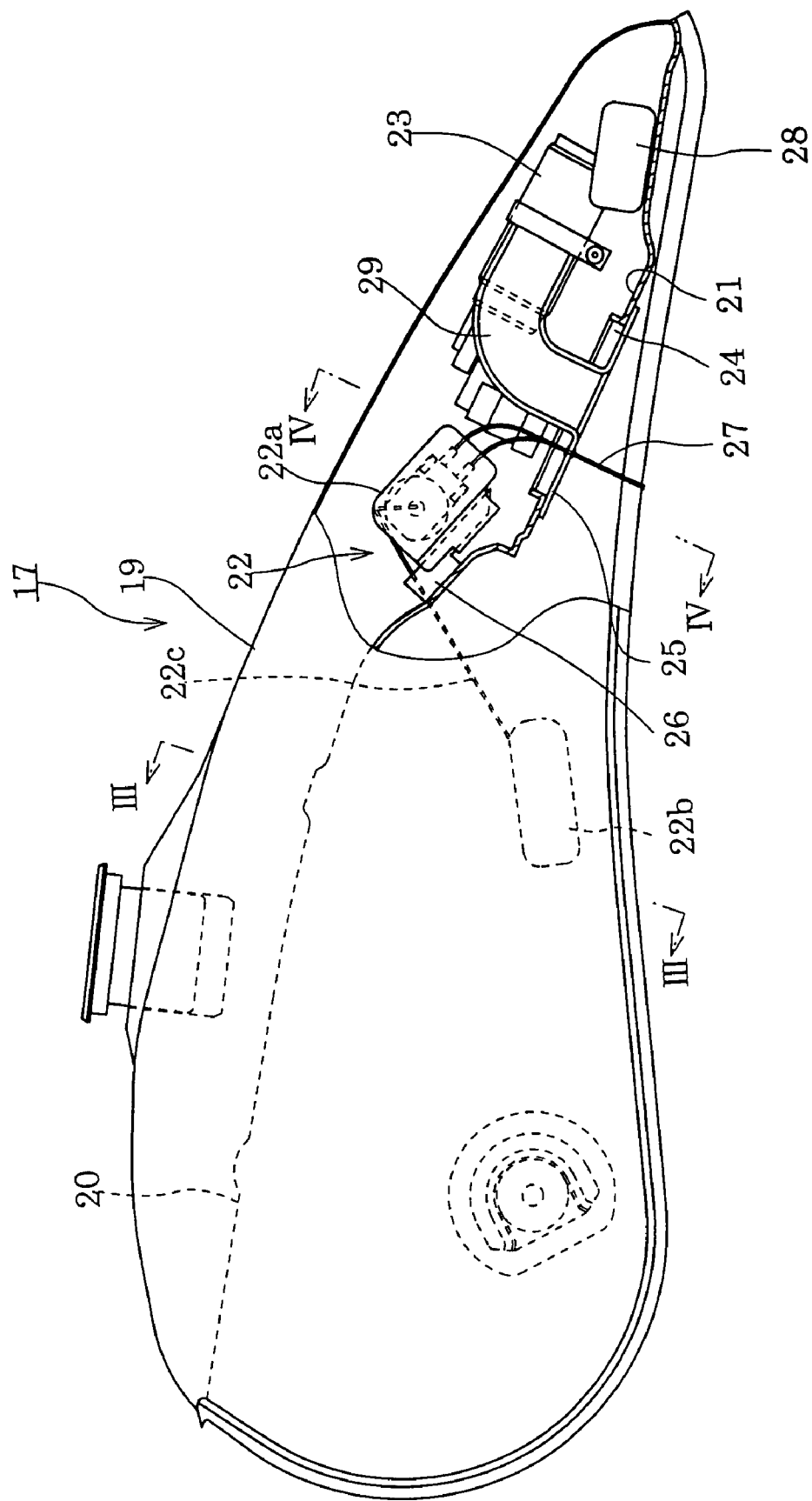
FIG. 2 is an enlarged left side view of the fuel tank.
Figure 3:
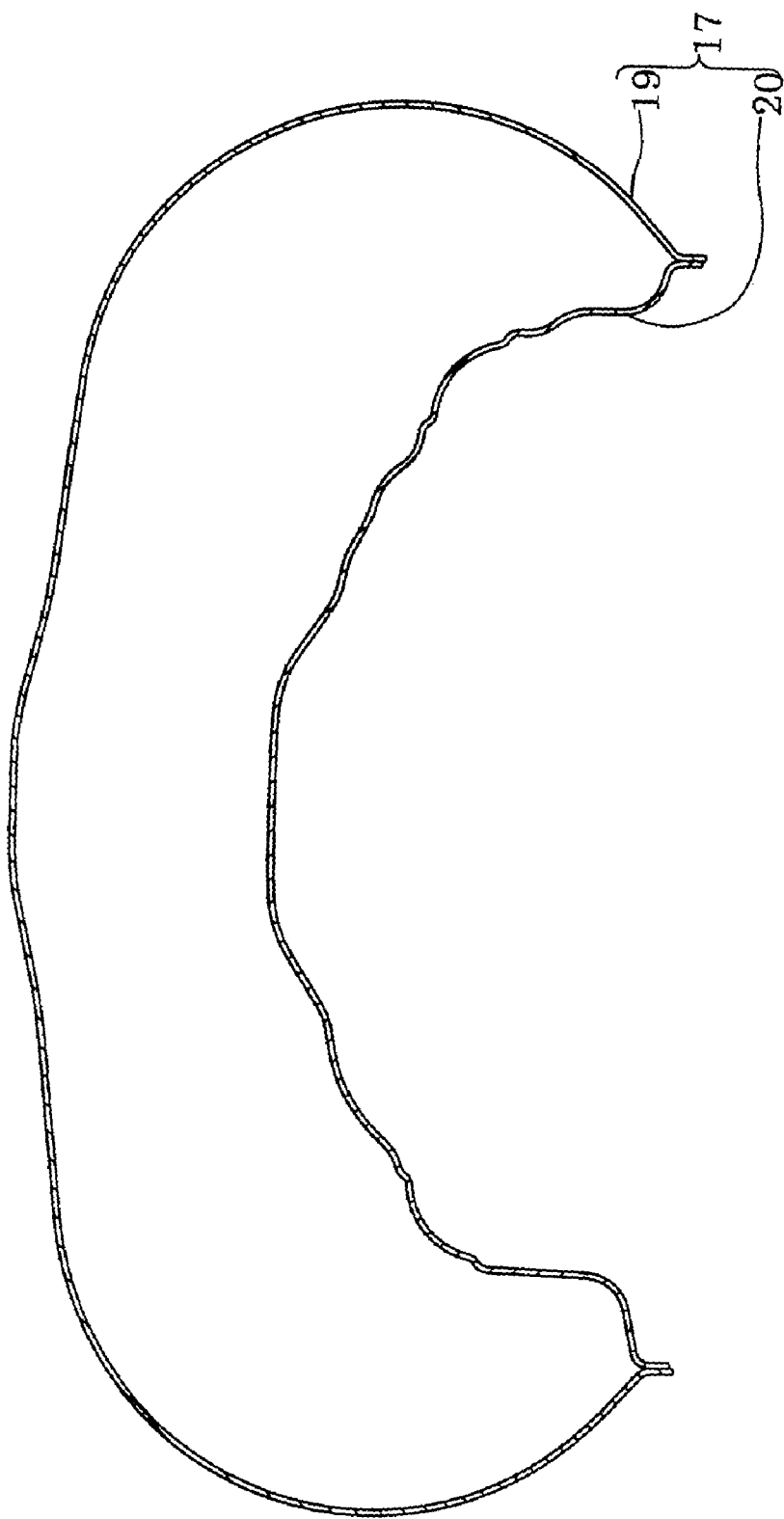
FIG. 3 is a sectional view taken along the line III-III of FIG. 2.
Figure 4:
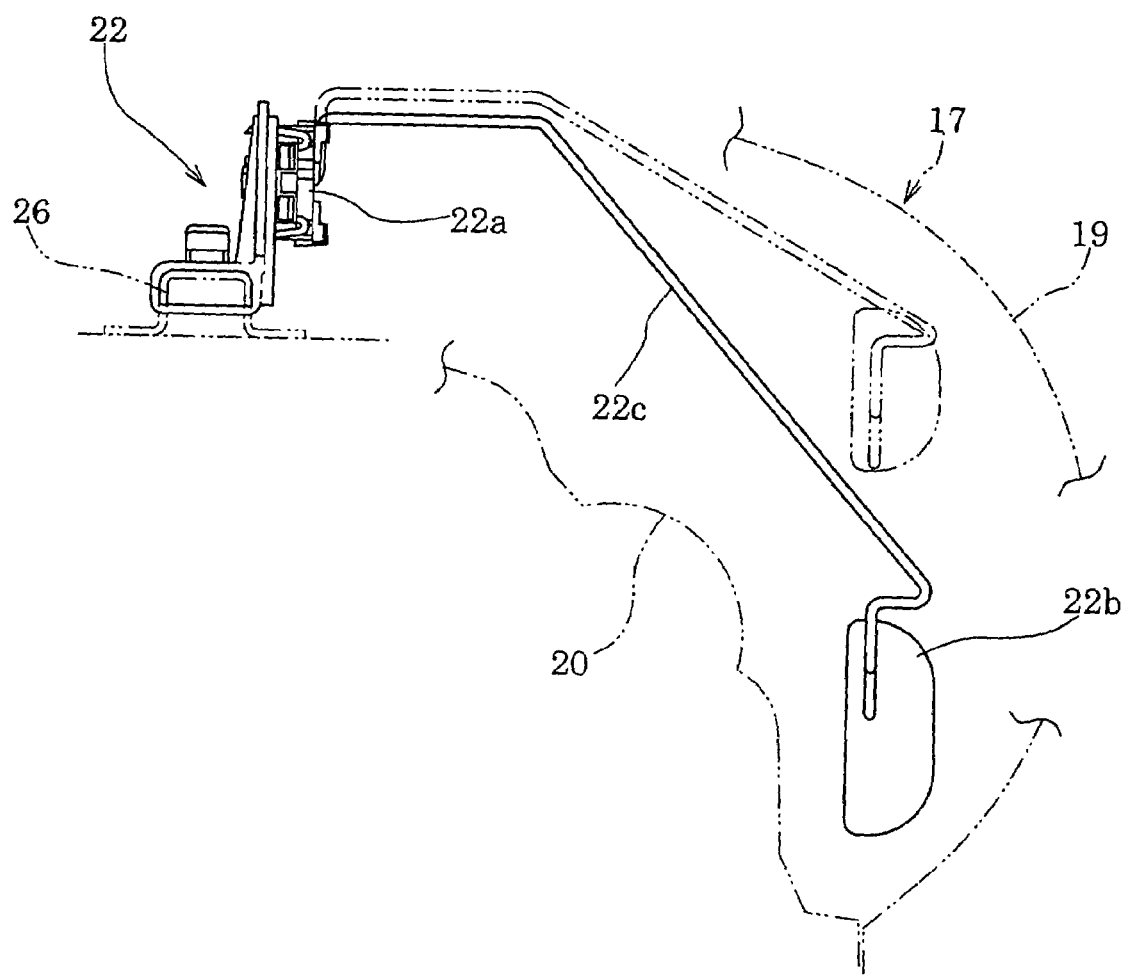
FIG. 4 is a sectional view taken along the line IV-IV of FIG. 2.

With reference to FIGS. 2 to 4, the fuel tank 17 includes a tank main body 19 having a transverse section of an approximately inverted U shape and a bottom plate 20 having a transverse section of approximately projecting shape, which closes an opening formed in the lower part of the tank main body 19 so that the fuel tank 17 has a downward recessed shape in the transverse section as a whole, and in a side view, the rear half of the fuel tank 17 has a teardrop shape tapering toward the end. In addition, the bottom plate 21 has a flat portion 21 at a rear portion thereof so as to decline rearward in a side view.

The fuel tank 17 is provided therein with a fuel gauge 22, which detects a fuel level in the fuel tank 17 and indicates the quantity of remaining fuel to a user. The motorcycle 1 according to the present embodiment employs a system for supplying the fuel to the engine 16 by a fuel injector, not shown. A fuel pump 23 for pumping the fuel to the fuel injector is provided for the fuel tank 17.

A communication hole 24 is formed in the flat portion 21 of the rear side of the bottom plate 20 so as to establish a communication between the inside and outside of the fuel tank 17, through which the fuel gauge 22 and the fuel pump 23 are inserted. The communication hole 24 is closed from the outside thereof by a lid member 25 in a liquid-tightly manner.

A bracket 26 for fixing a main body 22a of the fuel gauge 22 is provided on the bottom plate 20 at a portion near the front of the communication hole 24. The main body 22a of the fuel gauge 22 is fixed, via the bracket 26, on the bottom plate 20 of the fuel tank 17. A sensor arm 22c extends forward from the main body 22a of the fuel gauge 22 to be swingable upward or downward, and the sensor arm 22c has a float 22b at its leading end. As shown in FIG. 4, the float 22b is disposed on one side of the width direction of the fuel tank 17 having the transverse section recessed downward (right side in the illustrated embodiment). Signal lines 27 extending from the main body 22a of the fuel gauge 22 extend outside the fuel tank 17 through the lid member 25.

The fuel pump 23 is arranged behind the fuel gauge 22 and above the bottom plate 20 near the rear portion of the communication hole 24. The fuel pump 23 is disposed so that the longitudinal axis thereof extends along the longitudinal direction of the fuel pump 23, and is provided with a fuel strainer 28 at the rear end of the fuel pump 23. The fuel pump 23 is mounted and supported on a stay 29 extending from the lid member 25.

According to the present invention mentioned above, the following functions may be attained.

In general, the bottom plate 20 of the fuel tank 17 has a complicated shape in order to avoid contacting or influence of the arrangement of the body frame 2, engine 16, and peripheral devices arranged around the bottom plate 20. Then, in order to form the communication hole 24 to the bottom plate 20 and close liquid-tightly the hole 24 with the lid member 25, a wide flat surface will be required. Therefore, the installation of the fuel gauge 22 and the fuel pump 23 are constrained, and the arrangement of the peripheral devices will be also affected.

In order to obviate such defects, the main body 22a of the fuel gauge 22 is fixed, via the bracket 26, on the bottom plate 20 at a portion near the front side of the communication hole 24 formed in the bottom plate 20 of the fuel tank 17. In addition, the stay 29 is provided on the lid member 25 so as to close the communication hole 24, and the fuel pump 23 is attached to the stay 29. Such a configuration obviates the formation of a communication hole in the bottom plate 20, as in a conventional art, dedicated to insert the fuel gauge 22. Accordingly, the employment of such structure can avoid the complicated structure of the fuel tank 17 or increasing of the manufacturing costs, thus being convenient and advantageous.

The present invention is not limited to the described embodiment and many other changes and modifications may be made without departing from the scopes of the appended claims.

What is claimed is:

1. A fuel tank of a motorcycle provided with a motorcycle body, front and rear wheels, an engine mounted to the motorcycle body between the front and rear wheels, a rider's seat disposed therebetween, and a fuel tank disposed in front of a rider's seat and above an engine, wherein the fuel tank has a transverse section having an entirely recessed shape viewed from a lower side thereof and is tapered in a teardrop shape toward a rear half side of the fuel tank in a side view, the fuel tank has a lower opening which is closed by a bottom plate, the bottom plate having a rear portion formed with a flat portion declining rearward, and the bottom plate is formed with a communication hole so as to communicate inside and outside of the fuel tank, the communication hole having a size such that a fuel pump and a fuel gauge are inserted and being closed liquid-tightly by a lid member from an outside thereof, a fuel gauge is fixed to the bottom plate of the fuel tank at a portion near the front of the communication hole via a bracket, the fuel gauge including a sensor arm having a float at a leading end portion thereof to be swingable on a vertical plane along the longitudinal axis of the fuel tank, the float is disposed within one of downward recessed portions of the fuel tank, and the fuel pump is provided with a fuel strainer attached to the rear end thereof and arranged behind the fuel gauge so as to extend along the longitudinal axis thereof, the fuel pump is mounted and supported on a stay extending from the lid member.

2. The fuel tank for a motorcycle according to claim 1, wherein signal lines are connected at one of their ends thereof to the fuel gauge so as to extend therefrom outward the fuel tank through the lid member.

* * * * *